Figure 1:
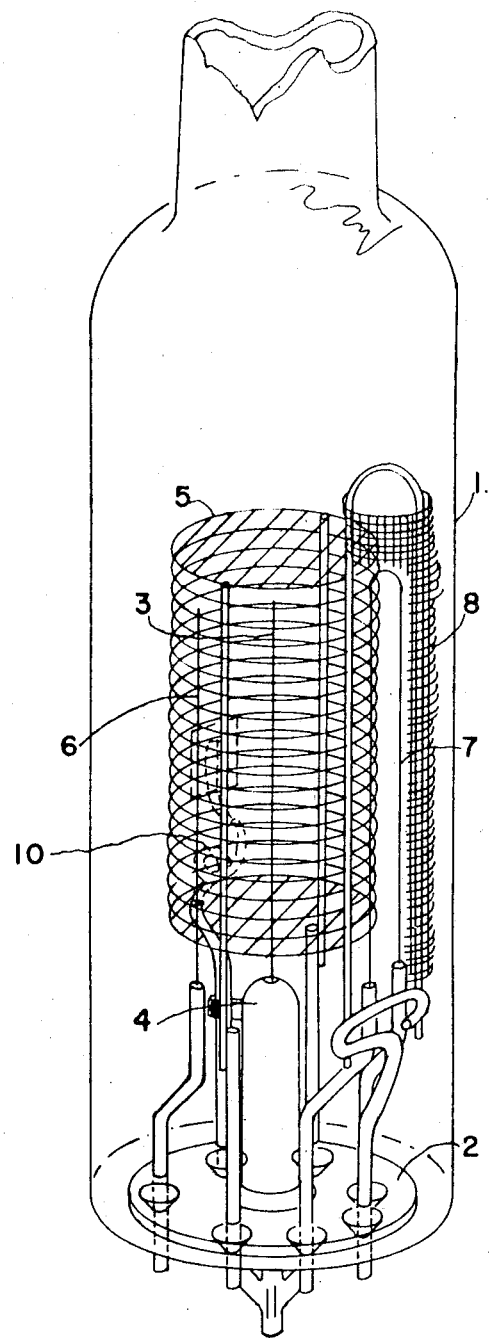

United States Patent [19]
Redhead

[11] 3,743,876
[45] July 3, 1973

[54] HOT-CATHODE IONIZATION GAUGE HAVING ELECTRODE MEANS FOR SHAPING THE ELECTRIC FIELD IN THE VICINITY OF THE CATHODE

[75] Inventor: Paul A. Redhead, Ottawa, Ontario, Canada

[73] Assignee: Canadian Patents and Development Limited, Ottowa, Ontario, Canada

[22] Filed: Oct. 7, 1969

[21] Appl. No.: 864,487

[52] U.S. Cl. ........................ 313/7, 313/313, 324/33
[51] Int. Cl. .............................................. H01j 7/16
[58] Field of Search ................... 324/33; 313/7, 313

[56] References Cited
UNITED STATES PATENTS

| | | | |
|---|---|---|---|
| 2,833,953 | 5/1958 | Rogers | 313/313 X |
| 3,319,117 | 5/1967 | Wheeler | 324/33 X |
| 3,248,587 | 4/1966 | Sano et al. | 313/313 X |
| 3,454,814 | 7/1969 | Mancebo | 313/313 X |
| 3,466,484 | 9/1969 | Clay, Jr. et al. | 313/7 |

*Primary Examiner*—Paul L. Gensler
*Attorney*—James R. Hughes

[57] ABSTRACT

A hot-cathode ionization gauge of the Bayard Alpert type having a central ion collector, a cylindrical grid surrounding the ion collector, a cathode for producing electrons positioned outside the grid, and a cathode-shield which when carrying a suitable voltage will shape the electric field gradient in the vicinity of the cathode such that electrons produced by the cathode will be launched into paths generally towards the ionizing volume of the gauge defined by the grid.

4 Claims, 3 Drawing Figures

Patented July 3, 1973

3,743,876

2 Sheets-Sheet 2

INVENTOR
PAUL A. REDHEAD
By J. R. Hughes
AGENT

HOT-CATHODE IONIZATION GAUGE HAVING ELECTRODE MEANS FOR SHAPING THE ELECTRIC FIELD IN THE VICINITY OF THE CATHODE

This invention relates to a hot-cathode ionization gauge and more particularly to an ionization gauge of the Bayard-Alpert type with improved sensitivity and repeatability Measurement of pressure in the ultrahigh vacuum range (below $10^{-9}$ Torr) requires the use of special vacuum gauges. For pressures above $10^{-11}$ Torr, a type of hot-cathode ionization gauge called a modulated Bayard-Alpert gauge is widely used. The sensitivity of the Bayard-Alpert gauge depends on the position of the cathode and the potential of the electrode or envelope surrounding the gauge. These effects result in considerable variation of sensitivity from one gauge to another and even a variation of sensitivity during the life of the gauge. Many attempts have been made to develop a gauge design that minimizes the variation of sensitivity and improves the gauge-to-gauge repeatability.

Variations in sensitivity of previous designs of Bayard-Alpert gauges could be reduced by very exact placement of the cathode relative to the other electrodes and careful control of the dimensions and potential of gauge envelope or surrounding electrodes. Both of these operations are difficult to do in production and would lead to a large increase of production costs.

The sensitivity of Baryard-Alpert gauges has been measured as a function of the grid-cathode spacing and found to vary as much as a factor of 2.5. It is suggested that the large variations of sensitivity from one gauge to another results from variability of cathode (filament) positioning.

It has been found that the sensitivity of gauges of this type can be related to the angular momentum about the axis of the grid with which electrons are launched into the grid. Those electrons with small angular momentum have the largest orbits in the useful ionizing volume.

It is an object of the present invention to provide an improved hot-cathode ionization gauge of the Bayard-Alpert type which has improved sensitivity andrepeatability.

It is another object of the invention to provide an ionization gauge whose sensitivity is independent of cathode position and of the potential of the envelope or outer electrode.

The above objects of the invention and others are achieved by a hot-cathode ionization gauge of the Bayard-Alpert type having a central ion collector, a cylindrical grid surrounding the ion collector, a cathode for producing electrons positioned adjacent to but outside the grid wherein the cathode has positioned near it a cathode-shield which when carrying a suitable voltage relative to the cathode will shape the electric field gradient in the vicinity of the cathode such that electrons produced by the cathode will have generally low angular momentum and will be launched into paths generally towards the ionizing volume defined by the grid.

Figure 2:
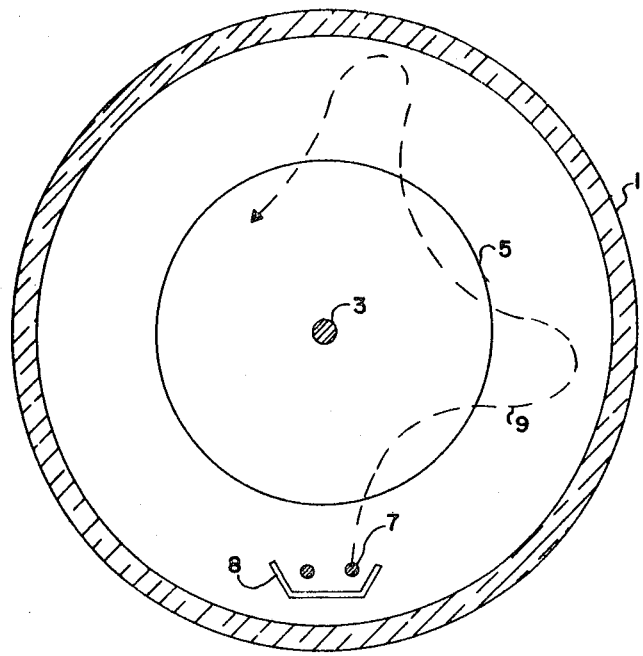
Figure 3:
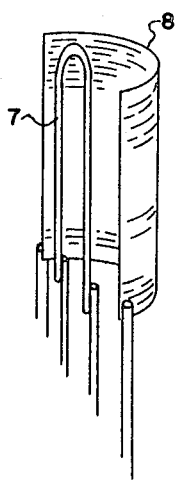

In drawings which illustrate an embodiment of the invention,

FIG. 1 is a view partially broken of an ionization gauge showing the positioning of the cathode shield, FIG. 2 is a cross-section in schematic form of the gauge of FIG. 1, and FIG. 3 is a view of a variant form of cathode shield.

Referring to FIG. 1, a hot-cathode ionization gauge of the modulated Bayard-Alpert type is shown having an envelope 1 and a central ion collector 3. The envelope includes an opening for connection to a system requiring a vacuum measurement. The ion collector is typically a fine wire and is shielded at its lower end by a metal tube 4. Surrounding the ion collector is a cylindrical grid 5 which is preferably made of refractory metal, typically platinum-clad molybdenum. A modulator wire 6 and a lead 10 for connection to the inside surface of the envelope are positioned inside the grid. A cathode or filament 7 is positioned adjacent to but outside grid 5 and is a tungsten wire in the shape of a hairpin normally coated with a low-work function material such as thorium oxide. The cathode is placed inside of or inwardly of a cathode shield which is shown as a semi-cylindrical grid structure made of refractory metal. All of the electrodes i.e., the ion collector, grid, modulator, cathode, and cathode shield are suitably supported on base 2 and have electrical leads passing to the exterior for connection to their respective voltage supply levels.

FIG. 2 shows a cross-section of the gauge of FIG. 1 with cathode shield 8 in this case being a straight-sided enclosure enclosing cathode wires 7 on their outward side. Without the shield, electrons from the cathode tend to have somewhat random paths and many electrons have high angular momentum i.e., travel in circumferential paths which is undesirable as they do not travel in the desired long and repeated paths through the ionization region inwardly of the grid before capture by the collector. The cathode shield when carrying a suitable voltage level in relation to the cathode and other electrodes acts to shape the electric field in the vicinity of the cathode. Electrons emitted by the the cathode or are caused by the field shaping to take up paths generally towards the grid i.e., with small angular momentum about the gauge. These paths as represented by dotted line 9 as representative, are the most effective and give long and repeated passes through the central ionization region. The cathode with the cathode shield forms a more efficient electron launching system and forces the electron to take up more useful orbital paths.

FIG. 3 shows a variant form of cathode shield 8. In this case the shield is a solid metal sheet spaced from cathode 7 and surrounding it on its outer side that is on its side away from the grid. The cathode shield may be solid, perforated, or a grid structure as in FIG. 1. It is preferable that is surround or encircle the cathode on its outer side such that proper shaping of the electric field will be achieved. In practice this electrode will be made with as little metal as practible as it is undesirable to have large metal surfaces in devices of this type.

The device may be operated with a glass envelope as shown. The inside of the glass would be made conductive with a transparent coating and would normally operate at or near ground potential. The device could also operate mounted directly in the vacuum system being measured. In this case a cylindrical metal grid would replace the glass tube envelope.

In an experimental gauge built and tested the following approximate electrical conditions resulted in best performance of the apparatus:

| | |
|---|---|
| Ion Collector Voltage | 0 |
| Grid Voltage | 150V |

| | |
|---|---|
| Cathode Voltage | 50V |
| Envelope Voltage | 0 |
| Collector Shield Voltage | 0 |
| Cathode-Shield Voltage | 50V |

The sensitivity of the gauge according to the invention is almost unaffected by voltage on the envelope and also unaffected by cathode position within a range of several millimeters. The sensitivity was found to be about five times that of most commercially available Bayard-Alpert gauges. The sensitivity factor of this gauge is about 55 Torr$^{-1}$ for nitrogen.

What is claimed is:

1. A hot-cathode ionization gauge of the Bayard-Alpert type comprising:
   a. a central ion collector,
   b. a cylindrical grid surrounding the ion collector,
   c. a cathode for producing electrons positioned adjacent to but outside the grid,
   d. electrode means for shaping the electric field in the vicinity of the said cathode such that electrons emitted by the cathode have generally low angular momentum about the grid axis and are launched into paths generally toward the grid, said electrode means being in the form of a metal structure at least partially surrounding the cathode on its outer side away from the grid.

2. A hot-cathode ionization gauge is in claim 1 wherein the electrode means carries a voltage substantially equal to that on the cathode.

3. A hot-cathode ionization gauge as in claim 1 wherein the metal structure is in the form of a curved grid.

4. A hot-cathode ionization gauge as in claim 1 wherein the metal structure is in the form of a curved metal ribbon.

* * * * *